United States Patent
Wang et al.

(10) Patent No.: US 6,801,484 B2
(45) Date of Patent: Oct. 5, 2004

(54) METHOD FOR GENERATING HEADER AND TRANSITION FLAGS USING DPD TECHNOLOGY AND OPTICAL DEVICE USING THE SAME

(75) Inventors: Ying-Tzung Wang, Hsinchu (TW); Chien-Ming Chen, Hsinchu (TW)

(73) Assignee: Media Tek Inc., Hsin Chu (TW)

( * ) Notice: Subject to any disclaimer, the term of this patent is extended or adjusted under 35 U.S.C. 154(b) by 567 days.

(21) Appl. No.: 09/949,748

(22) Filed: Sep. 12, 2001

(65) Prior Publication Data

US 2003/0048705 A1 Mar. 13, 2003

(51) Int. Cl.[7] .................................................. G11B 7/00
(52) U.S. Cl. ................................ 369/44.26; 369/44.42
(58) Field of Search ........................ 369/44.26, 44.42, 369/44.13, 47.27, 47.28

(56) References Cited

U.S. PATENT DOCUMENTS 6,690,629 B1 * 2/2004 Hayashi .................... 369/44.29

* cited by examiner

Primary Examiner—Nabil Hindi
(74) Attorney, Agent, or Firm—Birch, Stewart, Kolasch & Birch, LLP

(57) ABSTRACT

A method for generating header and transition flags using the DPD technology and an optical device using the same are disclosed. The method first sets a first and a second threshold levels. Then, the method generates a phase difference signal, i.e. starting a phase detection function to generate a phase difference signal. The method generates a first transition flag signal and a second transition flag signal, wherein the first transition flag signal is enable if the phase difference signal is greater than a first threshold level and the second transition flag signal is enable if the phase difference signal is smaller than the second threshold level. The method then generates a first header flag signal and a second header flag signal according to the transition flag signal. The first header flag signal is enable if the first transition flag signal becomes enable before the second transition flag does, and the second header flag signal is enable if the second transition flag signal becomes enable before the first transition flag does.

2 Claims, 8 Drawing Sheets (A)

(B)

METHOD FOR GENERATING HEADER AND TRANSITION FLAGS USING DPD TECHNOLOGY AND OPTICAL DEVICE USING THE SAME

BACKGROUND OF THE INVENTION

1. Field of Invention

The invention relates to a method for generating header and transition flags using the DPD (Differential Phase Detection) technology and an optical device using the same.

2. Related Art

In the DVD-RAM (Digital Versatile Disk RAM) structure, there are wobbled spiral groove and land tracks, and the phase change recording method is used at the centers of groove and land to reach the high density recording capacity. FIG. 1 shows such a track structure of wobbled grooves 13 and lands 14.

As shown in the drawing, each groove/land track is divided into several sectors. The user's data are continuously recorded on the groove/land track in units of ECC (Error Code Correction) blocks. Each ECC block consists of 16 sectors. Each sector has previously etched with a header field, containing a first/second header field 11, a third/fourth header field 12, and having Half-track pitch offsets in the radial direction. The header field of each sector has the same embossed pit/land structure as the DVD-ROM and contains CAPA's (Complementary Allocated Pit Address). Furthermore, as shown in FIG. 1, at the intersection of each loop of groove and land (such as the position 15 in the drawing) the last sector of the groove (land) connects to the first sector of the land (groove), and at the same time the polarities of the first/second header field 11 and the third/fourth header field 12 are changed.

To read the data in the DVD-RAM, the reading system has to use the header flag and the groove/land transition flag to control the reading actions. Nowadays, the so-called high frequency push-pull tracking method is used to generate the header flag signals and the groove/land transition flag signals according to the embossed header field. FIG. 2 shows the push-pull CAPA signal generated by following the groove and land tracks, where the polarities of FIGS. 2(A) and 2(B) are opposite to each other. As shown in the drawing, the level of the push-pull CAPA signal is very low at locations other than the header field. At the header field, the level of the push-pull CAPA signal increases and changes its sign according to the polarity of the header field.

Therefore, the system can only use a low-pass filter to filter the push-pull CAPA signal to generate the signal 21 as shown in FIGS. 3(A) and 3(D). After comparing with high and low threshold levels 22, 23, the header flag signals 26, 31 and the groove/land transition flag signals 24, 25 are readily obtained. If the order of the groove/land transition flag signals generated by the system is 24→25, it means that the groove data are being read and the system has to track the groove. On the other hand, if the order of the groove/land transition flag signals generated by the system is 25→24, it means that the land data are being read and the system has to track the land.

However, the high-frequency push-pull tracking signal is very sensitive to the lens shift, thus greatly influencing the header flag signal and groove/land transition flag signal generating method as described in FIG. 3. FIG. 4 shows the deformed wave of the push-pull CAPA signal filtered by the low-pass filter due to lens shifts. As shown in the drawing, it is impossible to generate groove/land transition flag signals 24, 25 according to the high and low threshold levels because of the push-pull CAPA signal deformation. Furthermore, due to the lack of the transition flag signal 24 or 25, it is also impossible to generate complete header flag signals 26, 31. This will result in the control system's being unable to function correctly.

SUMMARY OF THE INVENTION

In view of the foregoing, an object of the invention is to provide a method for correctly generating groove/land transition flag signals without being influenced by lens shifts.

Another object of the invention is to provide a method for generating groove/land transition flag signals using the DPD technology.

To achieve the above objects, the invention uses the DPD technology to generate header flags. The disclosed method includes the steps of: setting first and second threshold levels; generating a phase difference signal, i.e. starting a phase detection function to generate a phase difference signal; generating transition flag signals with a first transition flag signal and a second transition flag signal, where the first transition flag signal is HIGH if the phase difference signal is greater than the first threshold level, and the second transition flag signal is HIGH if the phase difference signal is smaller than the second threshold level; and generating a header flag signal according to the transition flag signal.

Using the DPD technology has the following advantages:

1. The DPD technology only produces a correct phase difference signal for an embossed pit/land structure and has a relatively small phase difference signal for a phase change structure. Furthermore, the DVD-RAM format contains the phase change areas recorded with user's data and embossed pit/land areas recorded with CAPA signals. Therefore, the phase difference signal can clearly distinguish the embossed pit/land areas and the phase change area.

2. Since the DPD technology is less sensitive to lens shifts, no phase difference signal errors will be generated by lens shifts.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The DPD (Differential Phase Detection) technology is usually used in DVD-ROM systems to check whether the optical head is in alignment with tracks and to generate a phase difference signal while crossing tracks. The invention uses the DPD technology in generating the header flag signal and the transition flag signal for DVD-RAM tracking.

Figure 5:
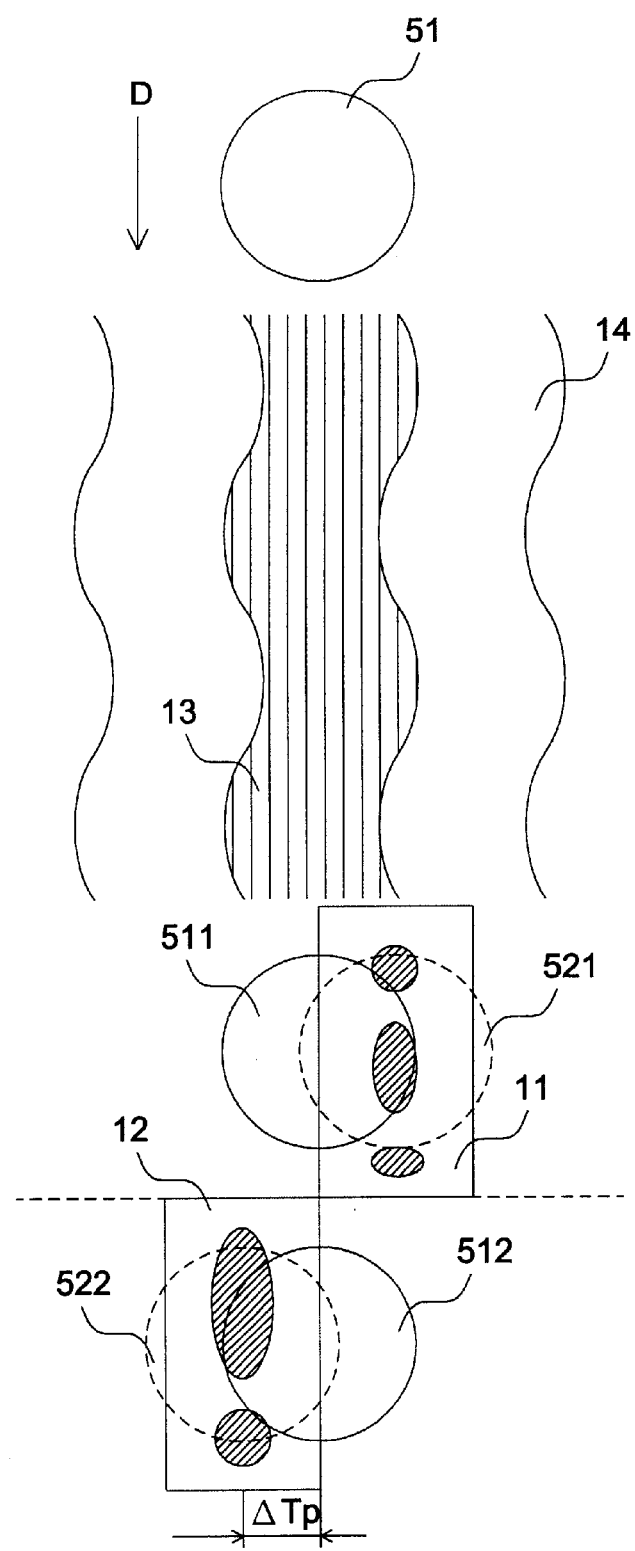
FIG. 5 is a schematic view showing a laser beam passing the sector boundary along a track.
Figure 6:
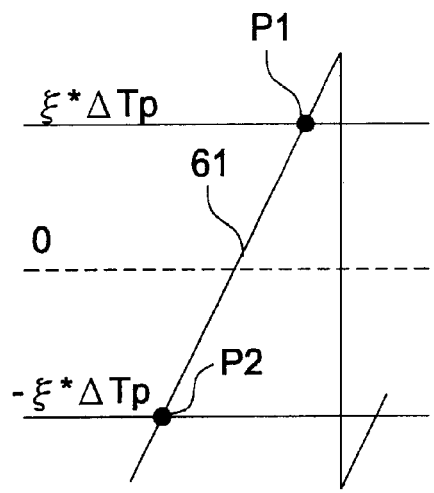
FIG. 6 shows the phase difference signal variation when the laser beam passes through the header field in the radial direction.

The following paragraphs explain the principle and method of generating header flag signals and groove/land transition flag signals during DVD-RAM tracking. FIG. 5 is a schematic view showing a laser beam passing the sector boundary along a track, while FIG. 6 shows the phase difference signal variation when the laser beam passes through the header field in the radial direction. As shown in FIG. 5, when a laser beam 521 aims at a first/second header field 11, the level of the phase difference signal 61 is 0 (see also FIG. 6). When the laser beam moves toward the left side of FIG. 5, the level of the phase difference signal 61 slowly increases. When the laser beam moves to the location 511, the level of the phase difference signal 61 is the value of P1. That is, P1=ξ*ΔTp, where ΔTp is the offset distance between the laser beam 521 and the track center and ξ is defined as the proportion coefficient from the offset distance to the phase difference signal. The position 511 of the laser beam is right at the track center of the DVD-RAM. Furthermore, when the laser beam 522 aims at a third/fourth header field 12, the level of the phase difference signal 61 is 0 (see FIG. 6). When the laser beam moves to the right side of FIG. 5, the level of the phase difference signal 61 slowly decreases. When the laser beam moves to the location 522, the level of the phase difference signal 61 is the value of P2. That is, P2=-ξ*ΔTp, where ΔTp is the offset distance between the laser beam 522 and the track center and ξ is defined as the proportion coefficient from the offset distance to the phase difference signal. The position 512 of the laser beam is right at the track center of the DVD-RAM.

Figure 7:
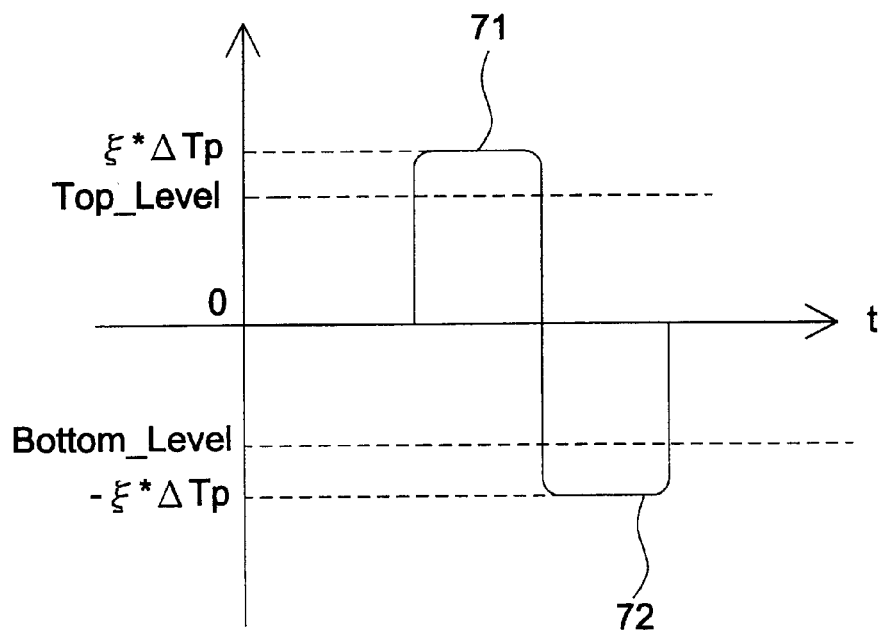
FIG. 7 shows a phase difference signal generated by the DPD technology at a sector intersection.

Therefore, when the laser beam 51 follows the tracking direction D and enters from the phase change area 13/14 to the first/second header field 11, the third/fourth header field 12, and the phase change area 13/14 of another sector, the phase difference signal generated by the DPD technology is shown in FIG. 7, where the horizontal axis is time and the vertical axis is the magnitude of the phase difference signal. In FIG. 7, the signal 71 is the transition flag signal produced when the laser beam 51 passes through the first/second header field 11 and the signal 72 is the transition flag signal produced when the laser beam 51 passes through the third/fourth header field 12. Since the DPD technology produces a relatively small phase difference signal for phase change areas, the signal in FIG. 7 can clearly distinguish the header fields and the phase change areas. Moreover, since lens shifts have very little effect on the phase difference signal, two high and low threshold levels $V_{th1}$ and $V_{th2}$ can be unambiguously defined.

Figure 1:
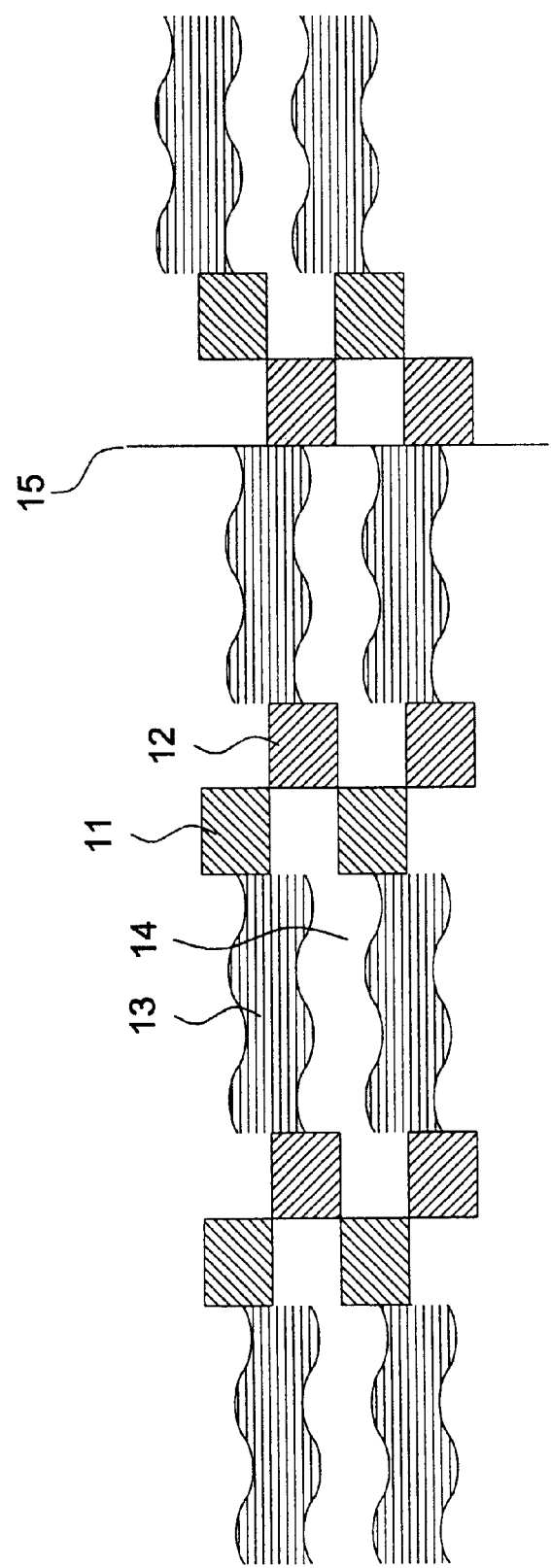
FIG. 1 shows a wobbled groove and land track structure for DVD-RAM.
Figure 2:
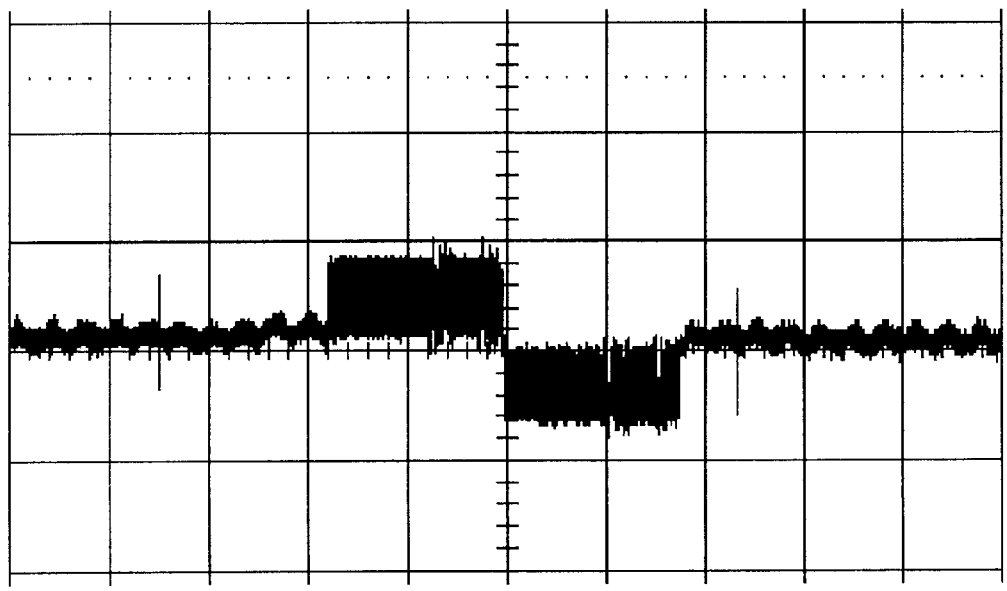
FIG. 2 shows push-pull CAPA signals generated by following the groove and land tracks.
Figure 2:
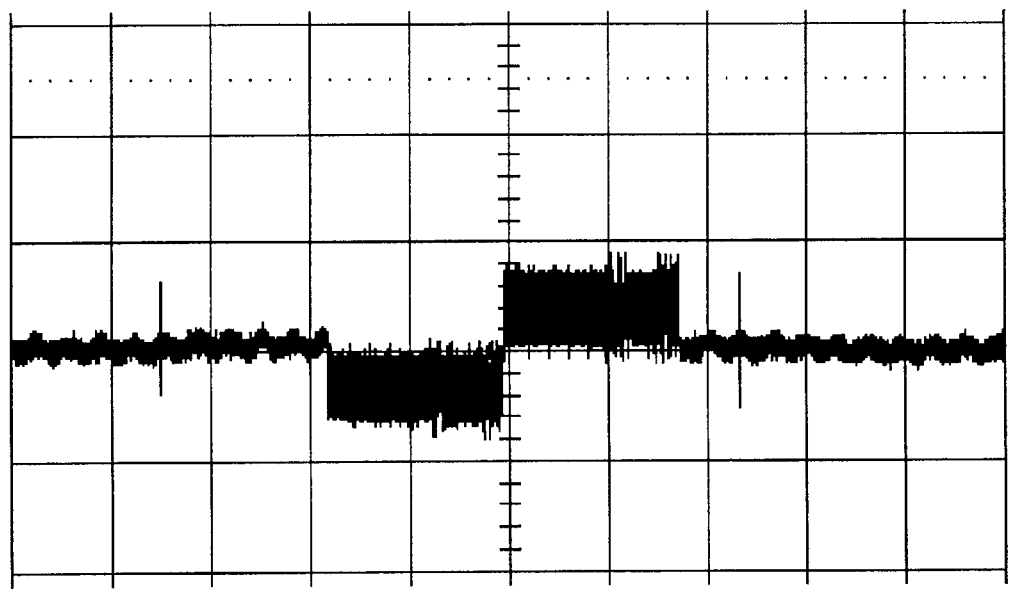
Figure 3:
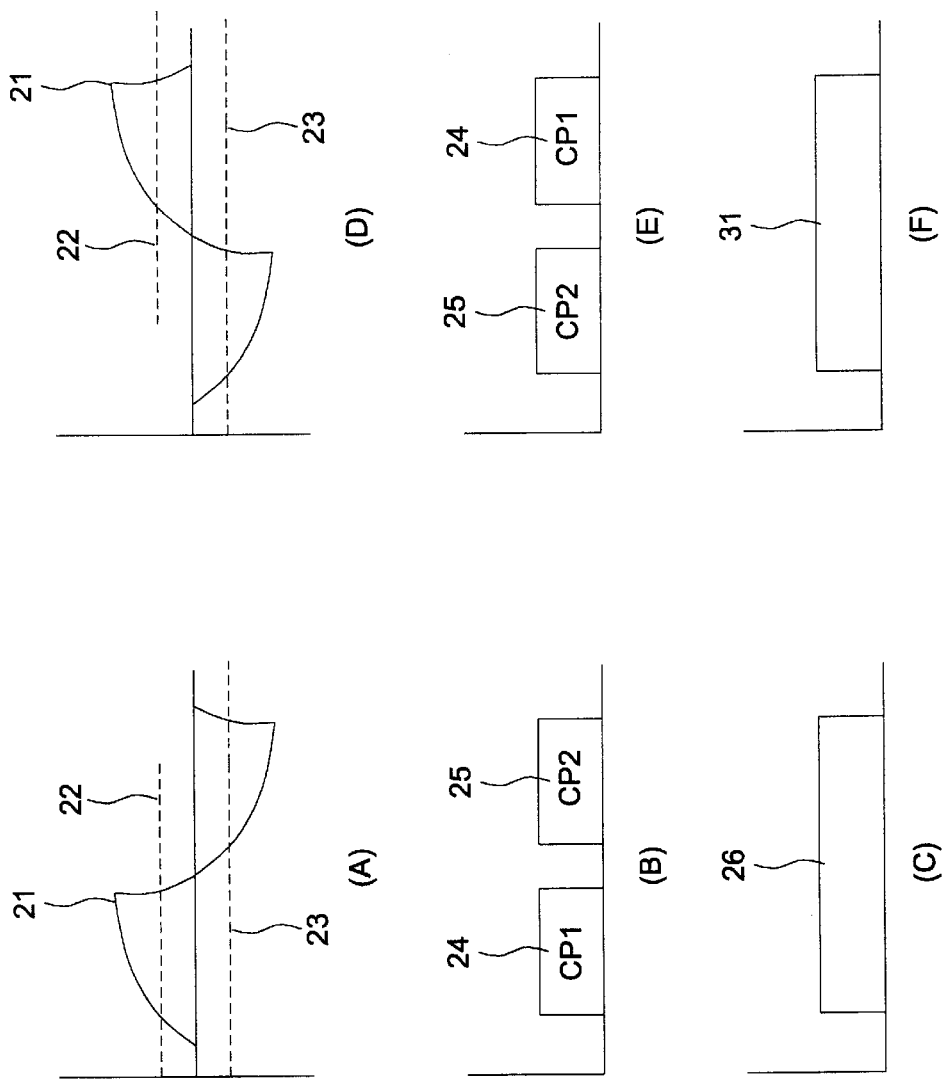
FIG. 3 shows a relevant signal wave generated by the push-pull CAPA signals filtered by a low-pass filter, where parts (A) and (D) are filtered CAPA signals, parts (B) and (E) are groove/land transition flag signals, and parts (C) and (F) are header flag signals.
Figure 4:
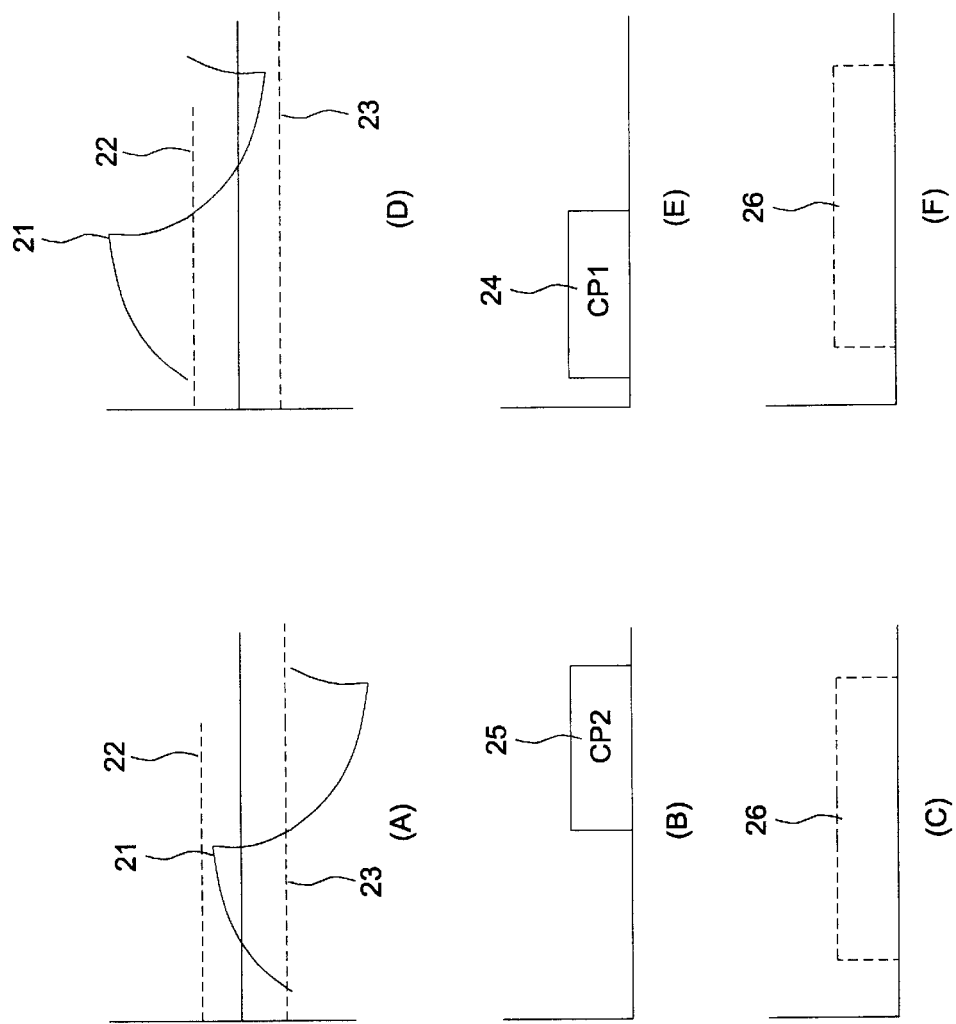
FIG. 4 shows a deformed wave of the push-pull CAPA signals filtered by a low-pass filter due to lens shifts, where parts (A) and (D) are filtered CAPA signals, parts (B) and (E) are groove/land transition flag signals, and parts (C) and (F) are header flag signals.

Since signals such as the one shown in FIG. 7 can be produced, the system can readily obtain the groove/land transition flag signals 24, 25 and the header flag signals 26, 31 as shown in FIG. 3. The first transition flag signal 24 is set to HIGH if the phase difference signal 71 is greater than the first threshold level, and the second transition flag signal 25 is set to HIGH if the phase difference signal 72 is smaller than the second threshold level. If the order of the groove/land transition flag signals 24, 25 generated by the system is 24→25, it means that the groove data are being read and the system has to track the grooves. On the other hand, if the order of the groove/land transition flag signals 24, 25 generated by the system is 25→24, it means that the land data are being read and the system has to track the lands. After the system obtains the groove/land transition flag signals 24, 25 and the header flag signals 26, 31, subsequent control procedures are the same as normal DVD-RAM and, therefore, are not further described herein.

Figure 8:
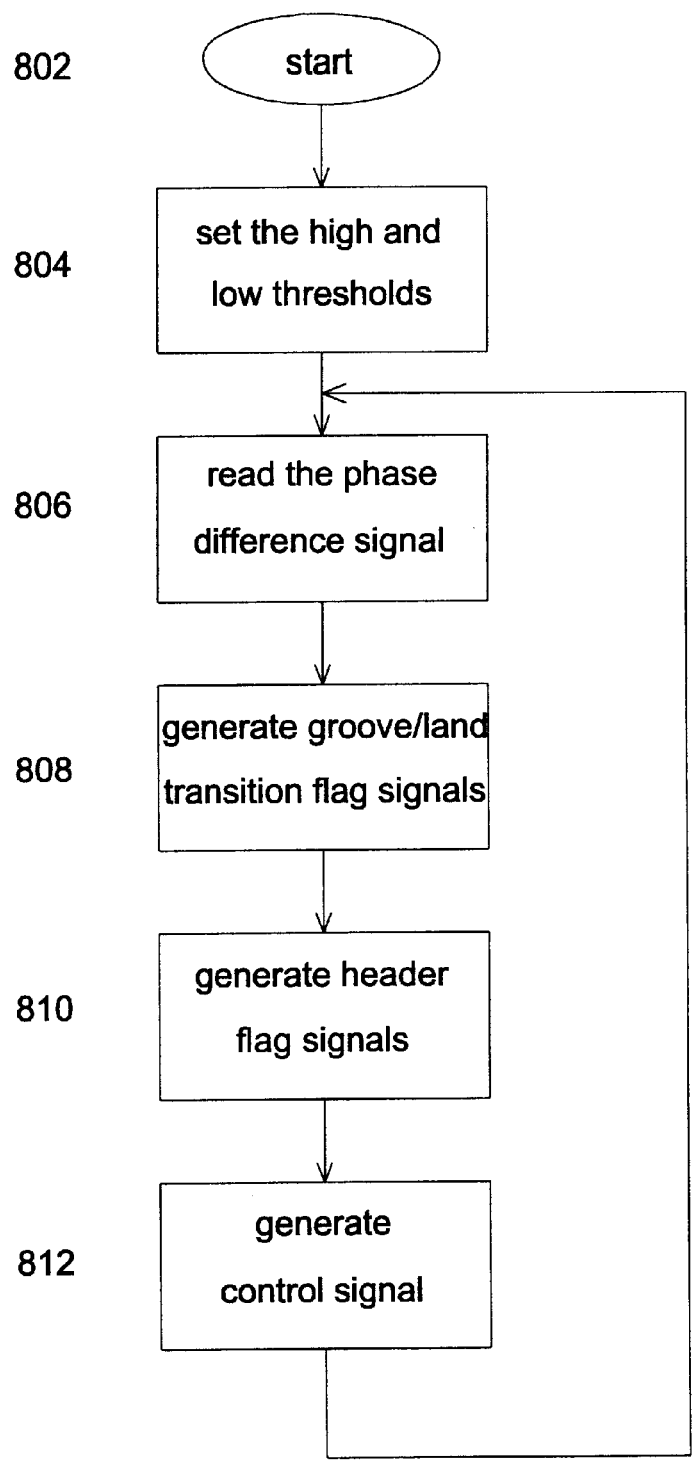
FIG. 8 shows a flowchart of generating data header and transition flags using the DPD technology.

The flowchart of the FIG. 8 explains the disclosed method of generating data header and transition flags using the DPD technology. The steps are following:

Step 802: Start.

Step 804: Set the high and low threshold levels Vth1 and Vth2.

Step 806: Read the phase difference signal vdp. The DPD technology is employed to generate the phase difference signal vdp in the tracking direction.

Step 808: Generate groove/land transition flag signals CP1 and CP2. The phase difference signal vdp are compared with the high and low threshold levels $V_{th1}$ and $V_{th2}$. The first transition flag signal CP1 is set to HIGH if the phase difference signal $V_{DP}$ is greater than the first threshold level $V_{th1}$. The second transition flag signal CP2 is set to HIGH if the phase difference signal $V_{DP}$ is smaller than the second threshold level $V_{th2}$.

Step 810: Generate header flag signals according to the groove/land transition flag signals CP1 and CP2. A first header flag signal 26 is generated when the first transition flag signal CP1 appears before the second transition flag CP2 does. A second header flag signal 31 is generated when the second transition flag signal CP2 appears before the first transition flag CP1 does.

Step 812: Generate control signal. The groove/land transition signals CP1, CP2 and the header flag signals are used to control reading and tracking actions. That is, when the transition flag CP1 first becomes HIGH before the transition flag CP does, it means the groove data are being read. The control system thus has to track on the grooves. Otherwise, the control system has to track on the lands.

The invention uses the DPD technology to generate phase difference signals in the tracking direction and, after comparing with the high and low threshold levels, produces groove/land transition flags. Subsequent procedures following the production of the groove/land transition flags are the same as the control system in the prior art and therefore are not further described herein.

Figure 9:
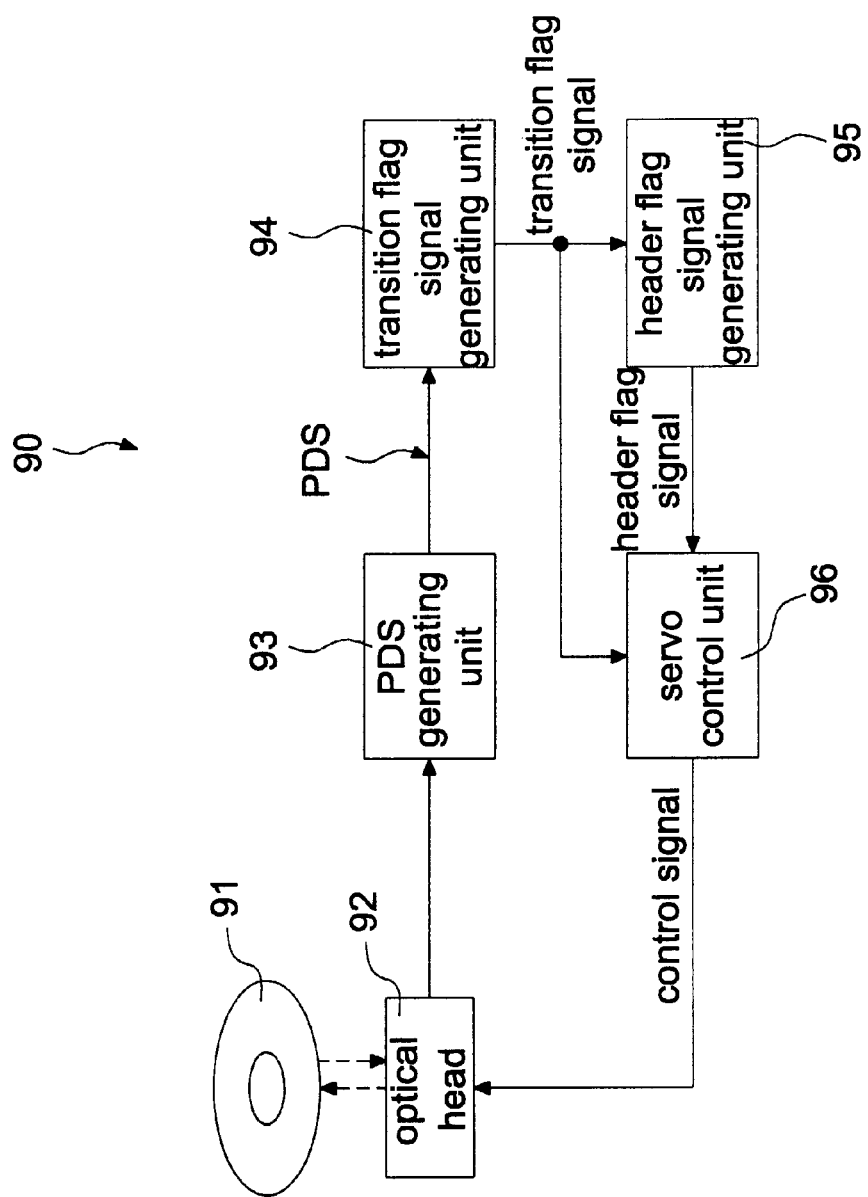
FIG. 9 is a block diagram of an optical device for generating data header and transition flags using the DPD technology.

FIG. 9 is a block diagram of an optical device for generating data header and transition flags using the DPD technology. As shown in the FIG. 9, an optical control device 90 uses a phase difference signal (PDS) generating unit 93 to generate a phase difference signal $V_{DP}$ after receiving the signal from an optical head 92. A transition flag signal generating unit 94 then compares the phase difference signal $V_{DP}$ and the high/low threshold levels $V_{th1}$ and $V_{th2}$ and generates groove/land transition flag signals. A first transition flag signal CP1 is set to HIGH if the phase difference signal $V_{DP}$ is greater than the high threshold level $V_{th1}$. A second transition flag signal CP2 is set to HIGH if the phase difference signal $V_{DP}$ is smaller than the low threshold level $Vth_2$. Afterwards, a header flag signal generating unit 95 generates header flag signals according to the groove/land transition flag signals CP1 and CP2. A header flag signal 26 is enable if the first transition flag signal CP1 appears before the second transition flag CP2 does. A second header flag signal 31 is enable if the second transition flag signal CP2 appears before the first transition flag CP1 does. A servo control unit 96 generates an appropriate control signal according to the transition flag signals CP1, CP2 and the header flag signals 26, 31 to control track locking and other relevant actions of the optical device.

Certain variations would be apparent to those skilled in the art, which variations are considered within the spirit and scope of the claimed invention.

What is claimed is:

1. A method for generating header flags using the DPD technology, comprising the steps of:

setting first and second threshold levels with the first threshold level higher than the second threshold level;

generating a phase difference signal by starting a phase detection function;

generating a first transition flag signal and a second transition flag signal, wherein the first transition flag signal is enable if the phase difference signal is greater than the first threshold level and the second transition flag signal is enable if the phase difference signal is smaller than the second threshold level; and generating a first header flag signal and a second header flag signal according to the transition flag signals, wherein the first header flag signal is enable if the first transition flag signal becomes enable before the second transition flag does, and the second header flag signal is enable if the second transition flag signal becomes enable before the first transition flag does.

2. An optical device for generating header flags using the DPD technology, comprising:

a phase difference signal generating unit for generating a phase difference signal of the optical disk along the track direction;

a transition flag signal generating unit for generating a first transition flag signal and a second transition signal, the first transition flag signal being enable if the phase difference signal is greater than a first threshold level and the second transition flag signal being enable if the phase difference signal is smaller than a second threshold level, wherein the first threshold level is higher than the second threshold level;

a header flag signal generating unit for generating a first header flag signal and a second header flag according to the first and second transition flag signals, wherein the first header flag signal is enable if the first transition flag signal becomes enable before the second transition flag does, and the second header flag signal is enable if the second transition flag signal becomes enable before the first transition flag does; and a servo control unit for generating a control signal according to the first and second transition flag signals and the first and second header flag signals to control actions of the optical device.

* * * * *